May 8, 1962  W. A. HAHS  3,033,615
BEARING HOUSING
Filed March 31, 1960
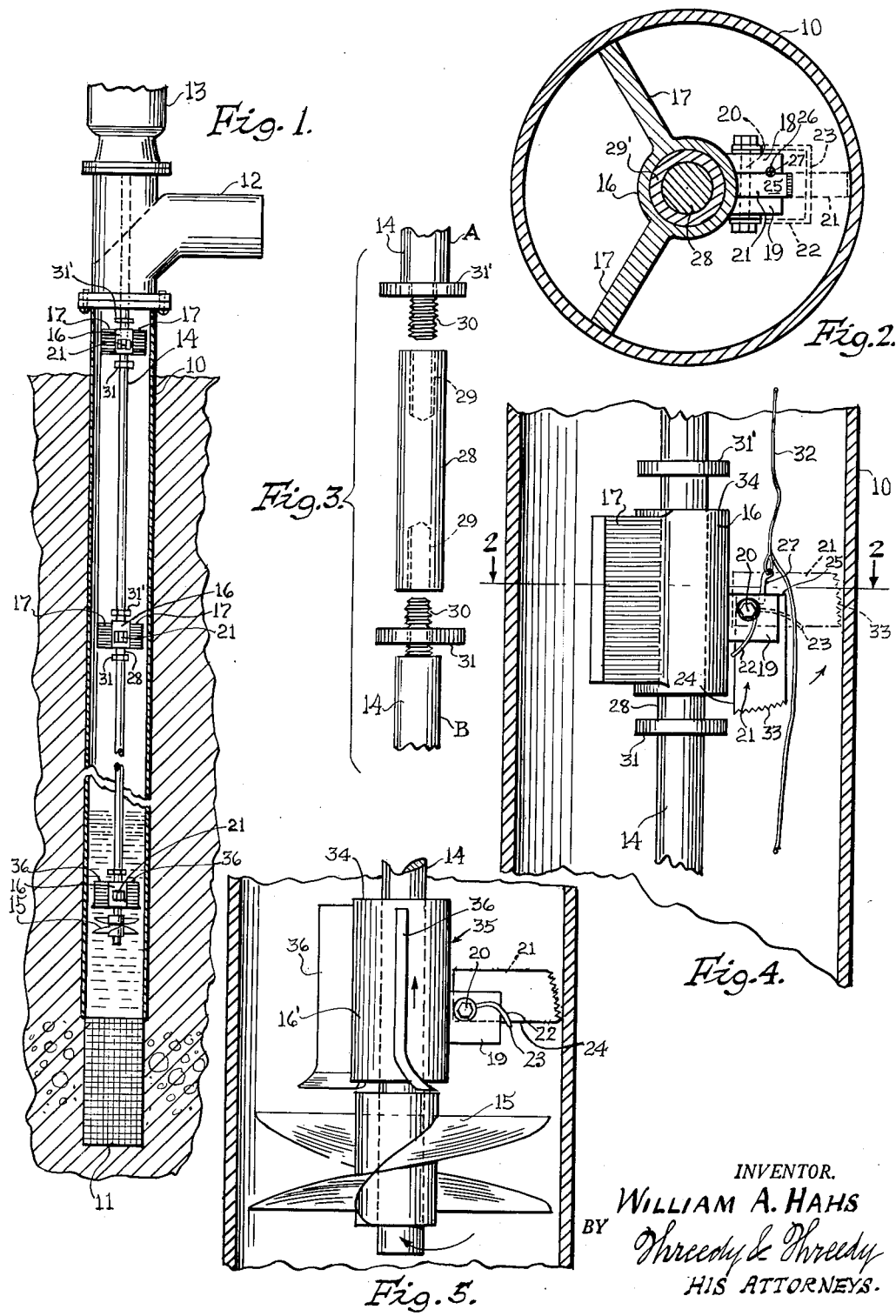
INVENTOR.
WILLIAM A. HAHS
BY Threedy & Threedy
HIS ATTORNEYS.

United States Patent Office 3,033,615
Patented May 8, 1962

3,033,615
BEARING HOUSING
William A. Hahs, Highway 61 S., Sikeston, Mo.
Filed Mar. 31, 1960, Ser. No. 18,925
8 Claims. (Cl. 308—4)

My invention relates to a new and useful improvement in a bearing housing and more particularly to a bearing housing for use in a tubular casing or the like.

An object of my invention is in the provision in a device of this character of an arrangement of parts whereby a housing for a bearing may be located within a tubular casing by inserting and passing the same therethrough.

A further object of my invention is in the provision in a device of this character of a means for removably securing the bearing housing at any desired location within a tubular casing or the like.

Yet another object of my invention is in the provision in a device of this character of a spider-type bearing housing having a spring urged securing means associated therewith.

A still further object of my invention is in the provision in a device of this character of a bearing housing for a tubular casing which will position and maintain a rotatable shaft concentric with the inner wall of the casing.

A still further object of my invention is in the provision in a device of this character of a removable latching means operatively associated with a movable leg portion thereof for maintaining the leg in an inoperative position during the locating of the housing within the casing.

An equally important object of my invention is in the provision in a device of this character of a means for transporting the bearing housing throughout the length of the tubular casing for positioning or removing the same with respect to the interior thereof.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a side elevational sectional view of my improved bearing housing within a tubular well casing;

FIG. 2 is a detailed sectional view taken on line 2—2 of FIG. 4;

FIG. 3 is a fragmentary side elevational view of certain parts of my invention in an exploded relation;

FIG. 4 is an enlarged fragmentary sectional view of a portion of the tubular casing with my improved bearing housing therein and showing in dotted lines the latching position of one leg thereof; and FIG. 5 is an enlarged fragmentary sectional view of the lowermost bearing housing in a well casing and associated with a water impeller.

My invention which relates to an improved bearing housing is shown and described herein as being associated with a tubular well casing. While I have shown this to be the preferred embodiment of my invention it will be clearly indicated by the following description that the bearing housing may be associated with any tubular structure that has uniform sides and is substantially straight throughout its longitudinal length.

Referring to FIG. 1 there is shown a tubular well casing 10 having at one end a screen element 11 which is disposed in a sunken position in the ground. The well casing 10 provides a water spout 12 and a motor housing 13 partially shown. Extending downwardly through the well casing 10 is a rotatable shaft 14 which terminates at its free end into a finned water impeller 15. It is noted that the water impeller 15 is preferably located below the static water level of the well.

Referring to FIG. 4 I show my improved bearing housing as including a circular hub 16. This hub 16 is provided with radially extending legs 17. The legs 17 being formed at a predetermined angled relation with respect to the hub 16 and as an integral part thereof. The hub 16 is provided with a laterally extending integral bracket comprising spaced apart arms 18 and 19. Mounted on a pin 20 which extends through the arms 18 and 19 is a movable latching leg 21. A U-shaped tension spring 22 has opposite end portions thereof connected to opposite ends of the pin 20 exterior of the legs 18 and 19. A portion 23 of the spring 22 is adapted to pass beneath one edge 24 of the leg 21. This spring will normally urge the leg 21 into a laterally extending position with respect to the hub 16.

The leg 18 and the inner end face 25 of the leg 21 are each provided with a confronting portion of an aperture 26. A removable stop pin 27 is adapted to be inserted into the confronting portions of the aperture 26. When the leg 21 is moved into an inoperative position which is a position in which the longitudinal length of the leg 21 extends parallel to the hub 16 and as is shown in full lines in FIG. 4, the pin 27 when inserted into the aperture 26 will bear upon each confronting portion thereof and operate to maintain the leg 21 in such inoperative position against the normal spring tension of the spring 22.

The shaft 14 comprises sections "A and B" which are connected together by a coupler 28. It is desired that this coupler 28 be made of a noncorrosive metal such as brass, stainless steel or the like. Each end of the coupler is internally threaded as at 29. Each end of each section of the shaft 14 provides a longitudinally extending threaded nipple 30. Threadable upon the nipples 30 are washers 31 and 31' each of which is of a diameter greater than the diameter of the shaft 14. When the washers 31 and 31' are threaded on each of the nipples 30 of each of the sections "A and B" of the shaft 14 the sections are then threaded into opposite ends of the coupler 28 to form a continuous longitudinally extending shaft. However, before the coupler is employed to connect the sections of the shaft 14 together it is passed through the hub 16 and sleeve bushing 29' provided thereby. The complete assembly of the shaft 14 and the coupler 28 carrying the bearing housing is clearly shown in FIG. 4.

The number of sections of the shaft 14 and consequently the number of coupler 28 employed are in direct ratio to the number of bearing housings adapted to be placed within the well casing 10. As viewed in FIG. 1 there are three bearing housings and therefore there are three couplers 28.

It should be noted at this time that the hub 16 of the bearing housing is slidable longitudinally on the coupler 28. Therefore when the coupler 28 is inserted into the hub 16 and the sections of the shaft 14 are connected together by the coupler 28 the hub 16 will normally rest on the lowermost washer 31. By varying the lengths of the sections of the shaft 14 it is readily apparent that the placement of the bearing housing within the casing 10 may be varied to suit the particular requirements of correctly positioning and supporting the shaft 14. The shaft 14 with all of the bearing housings can be assembled either as a unit before insertion into the casing 10 or the sections of the shaft 14 may be connected to respective couplers 28 as each section is placed into the casing 10. Each bearing housing will be seated upon the lowermost washer 31 so that its location with respect to the extremities of the casing 10 may be predetermined. When the bearing housing is positioned on its respective coupler 28 the leg 21 will be latched in its inoperative position by the pin 27. Each of the pins 27 so latching the movable leg 21 of each of the bearing housings in their inoperative positions may be connected to a wire 32 or the like. When the shaft 14 together with the bearing housings are located in their desired position within the casing 10 the wire 32 may be pulled withdrawing the pins 27 from the apertures 26 permitting each of the movable legs 21 through the action of the springs 22 to be pivoted into latching position which position is shown in the dotted lines in FIG. 4.

It is contemplated that the outer end face of the leg 21 be serrated as at 33 and be slightly arcuated in the direction of the upper end of the shaft 14.

When each of the legs 21 of each of the bearing housings has been released the shaft 14 is moved downward so that the uppermost washer 31' will come into contact with the top surface 34 of the hub 16 of each of the bearing housings. By striking the uppermost free end of the shaft 14 the bearing housing through the uppermost washer 31' will be forced downwardly and will cause the serrations 33 of the leg 21 to be firmly embedded into the inner wall of the casing 10.

It should be noted that the movable leg 21 in its latching position cooperates with the permanently formed legs 17 to concentrically position the shaft 14 with respect to the inner wall of the casing 10.

In the event that repairs are needed either to the shaft 14, the bushings 29' carried by each of the bearing housings or the impeller rotatably carried by the shaft 14, all that need be done to remove these specific parts is that the shaft 14 be lifted until the lowermost washer 31 associated with each hub 16 be brought into engagement with the lowermost surface thereof. By the employment of any suitable pulling device such as a chain hoist any continued upward movement of the shaft 14 will disengage the movable leg 21 and permit the shaft 14 to be forcibly withdrawn from the casing 10. Referring to FIG. 5 I wish to point out that the stationary legs 36 of the lowermost bearing housing 35 which is located immediately adjacent the impeller 15 be of such a length as to protrude downwardly beyond the lowermost surface of the hub 16' and be positioned relative thereto. The legs 36 will have their bottom portion curved outwardly and downwardly with respect to the hub 16' so as to deflect and prevent the lateral swirl of the water acted upon by the rotation of the impeller 15. This results in a more efficient movement of water through the casing 10 and therefore directly effects the volume of water pumped therethorugh. In the event that there is employed an extremely long shaft, it may be necessary to provide more than a single impeller, in which case the particular bearing housing as now described with the curved legs 36 will be used with such additional impeller.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A pump shaft and bearing housing for a tubular casing or the like including a rotatable shaft comprising a plurality of sections connected together, a removable coupler rotatably connecting said shaft sections together, a shaft bearing element providing a center hub through which is rotatably journaled said coupler, means on opposite ends of each shaft section and engaging opposite ends of said coupler when the same connects said sections together for supporting said hub on said coupler as said shaft is moved into and out of said casing, latching means on said hub having an operative and inoperative position, means for moving said latching means into a radially disposed operative position for engagement with the casing for latching the hub in a predetermined location intermediate the extremities of the casing after said hub has been moved interiorly of the casing by said shaft, said coupler being movable coaxially of said hub after said latching means has been moved into operative position, so as to engage one of the supporting means with one end of said hub so as to cause said hub to move in a direction transversely to the operative position of said latching means so as to increase the latching engagement of said latching means with said casing, and means for releasably maintaining said latching means in an inoperative position out of engagement with the casing while said hub is being moved into a predetermined position within the casing by the supporting means provided by said shaft.

2. A pump shaft and bearing housing for a tubular casing or the like including a rotatable shaft comprising a plurality of sections connected together, a removable coupler rotatably connecting said shaft sections together, a shaft bearing element providing a center hub through which is rotatably journaled said coupler, means on opposite ends of each shaft section and engaging opposite ends of said coupler when the same connects said sections together for supporting said hub on said coupler as said shaft is moved into and out of said casing, latching means on said hub having an operative and inoperative position, spring means for moving said latching means into a radially disposed operative position for engagement with the casing for latching the hub in a predetermined location intermediate the extremities of the casing after said hub has been moved interiorly of the casing by said shaft, said coupler being movable coaxially of said hub after said latching means has been moved into operative position, so as to engage one of the supporting means with one end of said hub so as to cause said hub to move in a direction transversely to the operative position of said latching means so as to increase the latching engagement of said latching means with said casing, and means for releasably maintaining said latching means in an inoperative position out of engagement with the casing while said hub is being moved into a predetermined position within the casing by the supporting means provided by said shaft.

3. A pump shaft and bearing housing for a tubular casing or the like including a rotatable shaft comprising a plurality of sections connected together, a removable coupler rotatably connecting said shaft sections together, a shaft bearing element providing a center hub through which is rotatably journaled said coupler, means on opposite ends of each shaft section and engaging opposite ends of said coupler when the same connects said sections together for supporting said hub on said coupler as said shaft is moved into and out of said casing, latching means on said hub having an operative and inoperative position, means for moving said latching means into a radially disposed operative position for engagement with the casing latching the hub in a predetermined location intermediate the extremities of the casing after said hub has been moved interiorly of the casing by said shaft, said coupler being movable coaxially of said hub after said latching means has been moved into operative position, so as to engage one of the supporting means with one end of said hub so as to cause said hub to move in a direction transversely to the operative position of said latching means so as to increase the latching engagement of said latching means with said casing, and a removable pin cooperating with a portion of said hub and said latching means for releasably maintaining said latching means in an inoperative position out of engagement with the casing while said hub is being moved into a predetermined position within the casing by the supporting means provided by said shaft.

4. A pump shaft and bearing housing for a tubular casing or the like including a rotatable shaft comprising a plurality of sections connected together, a removable coupler rotatably connecting said shaft sections together, a shaft bearing element providing a center hub through which is rotatably journaled said coupler, means on opposite ends of said shaft section and engaging opposite ends of said coupler when the same connects said sections together for supporting said hub on said coupler as said shaft is moved into and out of said casing, latching means on said hub having an operative and inoperative position, spring means for moving said latching means into a radially disposed operative position for engagement with the casing for latching the hub in a predetermined location intermediate the extremities of the casing after said hub has been moved interiorly of the casing by said shaft, said coupler being movable coaxially of said hub after said latching means has been moved into operative position, so as to engage one of the supporting means with one end of said hub so as to cause said hub to move in a direction transversely to the operative position of said latching means so as to increase the latching engagement of said latching means with said casing, and a removable pin cooperating with a portion of said hub and said latching means for releasably maintaining said latching means in an inoperative position out of engagement with the casing while said hub is being moved into a predetermined position within the casing by the supporting means provided by said shaft.

5. A pump shaft and bearing housing for a tubular casing or the like including a rotatable shaft comprising a plurality of sections connected together, a removable coupler rotatably connecting said shaft sections together, a shaft bearing element providing a center hub through which is rotatably journaled said coupler, means on opposite ends of said shaft section and engaging opposite ends of said coupler when the same connects said sections together for supporting said hub on said coupler as said shaft is moved into and out of said casing, a leg member pivotally connected to said hub and having an operative and inoperative position, means for moving said pivotal leg member into a radially disposed operative position for engagement with the casing for latching the hub in a predetermined location intermediate the extremities of the casing after said hub has been moved interiorly of the casing by said shaft, said coupler being movable coaxially of said hub after said leg member has been moved into operative position, so as to engage one of the supporting means with one end of said hub so as to cause said hub to move in a direction transversely to the operative position of said leg member so as to increase the latching engagement of said leg member with said casing, and means for releasably maintaining said pivotal leg member in an inoperative position out of engagement with said casing while said hub is being moved into a predetermined position within the casing by the supporting means provided by said shaft.

6. A pump shaft and bearing housing for a tubular casing or the like including a rotatable shaft comprising a plurality of sections connected together, a removable coupler rotatably connecting said shaft sections together, a shaft bearing element providing a center hub through which is rotatably journaled said coupler, means on opposite ends of said shaft section and engaging opposite ends of said coupler when the same connects said sections together for supporting said hub on said coupler as said shaft is moved into and out of said casing, a leg member pivotally connected to said hub and having an operative and inoperative position, spring means for moving said pivotal leg member into a radially disposed operative position for engagement with the casing for latching the hub in a predetermined location intermediate the extremities of the casing after said hub has been moved interiorly of the casing by said shaft, said coupler being movable coaxially of said hub after said leg member has been moved into operative position, so as to engage one of the supporting means with one end of said hub so as to cause said hub to move in a direction transversely to the operative position of said leg member so as to increase the latching engagement of said leg member with said casing, and means for releasably maintaining said pivotal leg member in an inoperative position out of engagement with the casing while said hub is being moved into a predetermined position within the casing by the supporting means provided by said shaft.

7. A pump shaft and bearing housing for a tubular casing or the like including a rotatable shaft comprising a plurality of sections connected together, a removable coupler rotatably connecting said shaft sections together, a shaft bearing element providing a center hub through which is rotatably journaled said coupler, means on opposite ends of said shaft section and engaging opposite ends of said coupler when the same connects said sections together for supporting said hub on said coupler as said shaft is moved into and out of said casing, a leg member pivotally connected to said hub and having an operative and inoperative position, means for moving said pivotal leg member into a radially disposed operative position for engagement with the casing for latching the hub in a predetermined location intermediate the extremities of the casing after said hub has been moved interiorly of the casing by the shaft, said coupler being movable coaxially of said hub after said leg member has been moved into operative position, so as to engage one of the supporting means with one end of said hub so as to cause said hub to move in a direction transversely to the operative position of said leg member so as to increase the latching engagement of said leg member with said casing, and a removable pin cooperating with a portion of said hub and said latching means for releasably maintaining said pivotal leg member in an inoperative position out of engagement with the casing while said hub is being moved into a predetermined position within the casing by the supporting means provided by said shaft.

8. A pump shaft and bearing housing for a tubular casing or the like including a rotatable shaft comprising a plurality of sections connected together, a removable coupler rotatably connecting said shaft sections together, a shaft bearing element providing a center hub through which is rotatably journaled said coupler, means on opposite ends of said shaft section and engaging opposite ends of said coupler when the same connects said sections together for supporting said hub on said coupler as said shaft is moved into and out of said casing, a leg member pivotally connected to said hub and having an operative and an inoperative position, spring means for moving said pivotal leg member into a radially disposed operative position for engagement with the casing for latching the hub in a predetermined location intermediate the extremities of the casing after said hub has been moved interiorly of the casing by said shaft, said coupler being movable coaxially of said hub after said leg member has been moved into operative position, so as to engage one of the supporting means with one end of said hub so as to cause said hub to move in a direction transversely to the operative position of said leg member so as to increase the latching engagement of said leg member with said casing, and a removable pin cooperating with a portion of said hub and said latching means for releasably maintaining said pivotal leg member in an inoperative position out of engagement with the casing while said hub is being moved into a predetermined position within the casing by the supporting means provided by said shaft.

References Cited in the file of this patent

UNITED STATES PATENTS

| 1,039,737 | Hester | Oct. 1, 1912 |
| 2,640,427 | Domer | June 2, 1953 |